United States Patent [19]
Kipke et al.

[11] 3,870,912
[45] Mar. 11, 1975

[54] SMOOTH-CORE ROTOR FOR A SYNCHRONOUS ELECTRIC MACHINE

[75] Inventors: Eberhard Kipke; Erich Losensky, both of Berlin, Germany

[73] Assignee: Siemens Aktiengesellschaft, Munich, Germany

[22] Filed: May 4, 1973

[21] Appl. No.: 357,259

[30] Foreign Application Priority Data
May 18, 1972  Germany............................ 22249123

[52] U.S. Cl. .............................................. 310/183
[51] Int. Cl. .............................................. H02k 3/16
[58] Field of Search ....... 310/182, 59, 183, 52, 210, 310/58, 211, 61, 214–217, 261–265

[56] References Cited
UNITED STATES PATENTS

| | | | |
|---|---|---|---|
| 976,670 | 11/1910 | Maxwell | 310/211 |
| 1,637,182 | 7/1927 | Glaubitz | 310/211 |
| 2,789,239 | 4/1957 | Thames | 310/183 |
| 2,815,461 | 12/1957 | Jernberg | 310/183 |
| 3,194,996 | 7/1965 | Lynn | 310/211 |
| 3,621,315 | 11/1971 | Dalmo | 310/214 |

FOREIGN PATENTS OR APPLICATIONS

| | | | |
|---|---|---|---|
| 1,229,977 | 9/1960 | France | 310/183 |
| 83,787 | 8/1971 | Germany | 310/183 |

*Primary Examiner*—R. Skudy
*Attorney, Agent, or Firm*—Kenyon & Kenyon Reilly Carr & Chapin

[57] ABSTRACT

A smooth-core rotor for a synchronous electric machine is disclosed and is equipped with pressure plates at respective ends of the rotor stack. In the region of the excitation winding, each damper bar is connected individually with a pressure finger of each pressure plate, and in the region of a pole, the damper bars are connected with an edge of each of the pressure plates. The connection can be made for example by welding directly or by welding with an intermediate member interposed.

4 Claims, 6 Drawing Figures

3,870,912
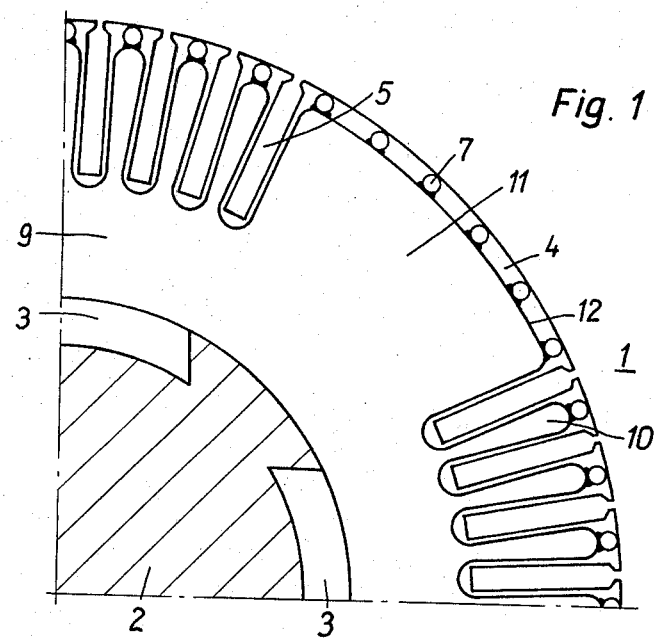
Fig. 1
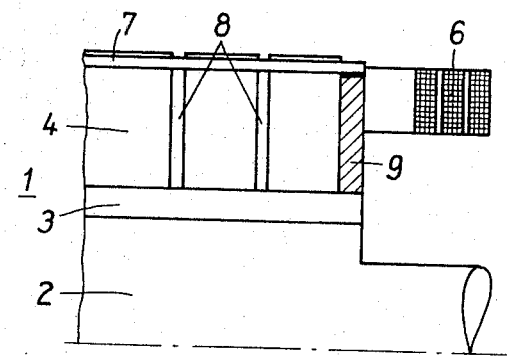
Fig. 2
Fig. 3  Fig. 4  Fig. 5  Fig. 6
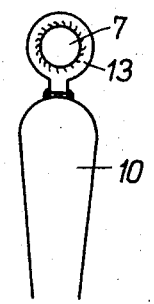 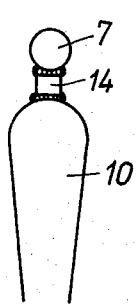 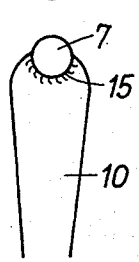 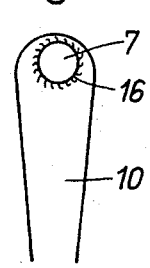

SMOOTH-CORE ROTOR FOR A SYNCHRONOUS ELECTRIC MACHINE

BACKGROUND OF THE INVENTION

The invention relates to a synchronous electric machine with a smooth-core rotor wherein the damper bars are connected at each end face of the machine to the pressure plates which constitute the shorting ring of the laminated rotor stack, these connections being made within the frame formed by the excitation coils. Such a synchronous machine is described in Wirtschaftspatent 83,787 of the German Democratic Republic; this reference discloses that several damper bars are connected, as customary, with each other by segments which contain cutouts through which the damper bars are inserted. These segments are adjacent to the outside diameter of the rotor and are then in turn connected via intermediate members with shorting rings which serve simultaneously as pressure plates for the laminated rotor stack. These pressure plates thus cover the radially inner part of the rotor lamination stack. They may also be provided with projections which then form the connection to the segments. In this manner, the connection of the individual damper segments with each other is located on a smaller radius than the exciter windings, so that space is gained in the region of the winding end turns.

SUMMARY OF THE INVENTION

It is an object of the invention to further simplify such a connection of the damper bars by means of the pressure plates.

It is another object of the invention to provide a smooth-core rotor for a synchronous electric machine wherein a substantial savings in space is realized in the region of the end turns of the excitation windings.

According to the invention, each damper bar in the area of the exciter winding is individually connected with one pressure finger each, and each damper bar in the area of the pole projection with the edge of the pressure plate.

The smooth-core rotor of the invention is operable in a synchronous electric machine and includes as a feature a plurality of excitation windings. A rotor stack consisting of a stack of rotor laminations defines respective rotor end faces and a plurality of radial pole projections for corresponding ones of the excitation windings. The rotor stack further defines a plurality of slots disposed on respective sides of each one of the pole projections for accommodating the turns of the corresponding excitation winding. Each two mutually adjacent ones of the slots define a rotor tooth between them. The rotor also has a damper arrangement which includes a plurality of damper bars disposed on the rotor stack, a portion of the damper bars being arranged at the rotor teeth and the remainder of the damper bars at the pole projections defined by the rotor stack. A pressure plate is disposed at each longitudinal end face of the rotor stack. The pressure plates are each configured to have pressure fingers at corresponding ones of the rotor teeth and to have an edge portion at each one of the pole projections. Each of the damper bars of the portion thereof arranged at the slots are joined individually with corresponding ones of the pressure fingers and each of the damper bars of the remainer are individually joined to the edge portion corresponding to the pole projection whereat the damper bar is arranged whereby the pressure plates short circuit all of the damper bars to each other at each of the rotor end faces.

The individual damper bars are therefore always directly connected with the pressure plate which is configured to have pressure fingers in the area of the slots in the manner customary for large electric machines and which also substantially covers the area of the pole projection so that a uniform application of the pressure on the rotor lamination stack is achieved. The segments which have heretofore been used in connection with damper windings become unnecessary. With the invention, there is obtained a direct connection between the damper bars which saves a most considerable amount of space. It is customary that the damper bars consist of a material of high conductivity and that the pressure plate is made of steel without any change of the electrical properties of the damper cage from damper arrangements used heretofore. For, it is possible with present-day manufacturing methods to join materials of different composition, such as, for instance, steel and copper in such a manner that the joint is mechanically strong as well as highly conductive electrically, the joint being made, for example, by welding. The pressure plates which serve as the shorting connections of the damper cage impart to the latter high resistance against and dynamic stresses because they are solidly clamped with the rotor lamination stack. Bending stresses are also kept from the point where the damper bars are clamped because this point is located directly where the damper bars leave the rotor lamination stack.

According to a preferred subsidiary embodiment of the invention the connection between the pressure fingers and the damper bars is made by providing openings at the ends of the pressure fingers which correspond to the shape of the damper bars, and the pressure fingers therefore surround the damper bars on at least a part of the circumference of the bar. The connection between the pressure finger and the damper bar can then be made by soldering or welding. However, a large separation can be left between the pressure finger and the damper bar and for this embodiment the separation is bridged by an intermediate member which is connected in an electrically conducting manner with the pressure finger on the one hand, and with the damper bar on the other hand, by soldering, welding or another suitable bonding means.

Although the invention is illustrated and described herein as a smooth-core rotor for a synchronous electric machine, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

Similar or like components are designated by the same reference numeral in each FIG. in which they appear.

FIG. 1 illustrates a quadrant, partially in section, of a smooth core rotor of a synchronous electric machine according to the invention.

FIG. 2 is a half longitudinal view, partially in section, taken through the rotor according of FIG. 1.

FIGS. 3 to 6 illustrate the respective embodiments of connections between the pressure fingers of a pressure plate and respective damper bars.

DESCRIPTION OF THE PREFERRED EMBODIMENTS OF THE INVENTION

The smooth-core rotor 1 of a synchronous electric machine is made up of a rotor spider 2 having cutouts forming cooling ducts 3 and the rotor lamination stack 4. The stack 4 has slots 5 for receiving the excitation winding 6 as well as cutouts for receiving the damper bars 7. The individual laminations of the rotor lamination stack 4 are stacked in a manner to form radially extending cooling channels 8 distributed over the length of the rotor.

The individual laminations of the rotor lamination stack 4 are clamped together by means of pressure plates 9 situated respectively at each end face of the machine. To obtain a pressure as uniform as possible on the entire rotor lamination stack 4, the pressure plate 9 is configured in the region of the slots 5 for the exciter winding 6 to have pressure fingers 10; and in the region of the pole projection 11, the edge 12 of the plate 9 lies directly beneath the damper bars 7.

So that the individual damper bars 7 form an effective damper cage, they must be connected with each other at the end faces of the machine by respective shorting rings. The respective pressure plates 9 serve this purpose. The damper bars 7 are therefore connected in the region of the pole projection directly with the edge 12 of the pressure plate 9, and the damper bars 7 situated in the region of the excitation winding 6 are always attached individually to the pressure fingers 10. This attachment can be made in a suitable manner such as by soldering, welding, riveting or swedging, but care must always be taken that a mechanically strong and good electrically conducting joint is obtained.

FIG. 3 shows a possible embodiment of such a joint in which the pressure finger 10 is brought not quite to the damper winding bar 7. Rather, the damper winding bar 7 is enclosed by a sleeve 13 and connected with it along the circumference in a highly conducting manner. The sleeve 13 in turn is then welded to the pressure finger 10.

Referring to FIG. 4, a greater spacing between the pressure finger 10 and the damper bar 7 can also be bridged by a simple intermediate member 14 having the shape of a parallelopiped and is welded to the damper bar 7 as well as to the pressure finger 10.

Another embodiment of the joint between the pressure finger 10 and the damper rod 7 is shown in FIG. 5 and includes a cutout 15 at the upper edge of the pressure finger 10. The cutout 15 corresponds to the shape of the damper bar 7. In this way, the pressure finger 10 partially surrounds the damper bar 7 and is welded directly thereto.

As shown in FIG. 6, in some cases it may also be advantageous to configure the pressure finger 10 to enclose the damper bar 7 completely so that the latter is brought through a corresponding cutout 16 and is welded to the pressure finger 10 on all sides along its entire circumference.

What is claimed is:

1. A smooth-core rotor for a synchronous electric machine comprising a plurality of excitation windings; a rotor stack consisting of a stack of rotor laminations, said rotor stack defining respective longitudinal rotor end faces and defining a plurality of radial pole projections for corresponding ones of said excitation windings, said rotor stack further defining a plurality of slots disposed on respective sides of each one of said pole projections for accommodating the turns of the corresponding excitation winding, each two mutually adjacent ones of said slots defining a rotor tooth between them; and a damper arrangement including a plurality of damper bars disposed on said rotor stack, a portion of said damper bars being arranged at the rotor teeth and the remainder of said damper bars being arranged at the pole projections of said rotor stack, and a steel pressure plate disposed at each longitudinal end face of said rotor stack for clamping the stack of rotor laminations together, said steel pressure plates each defining a plane and being configured to have pressure fingers at corresponding ones of the rotor teeth and to have an edge portion at each one of said pole projections, said pressure fingers and said edge portions being in the plane of said plate and extending into the immediate vicinity of said damper bars, each of said damper bars of said portion thereof being individually welded to corresponding ones of said pressure fingers and each of the damper bars of said remainder thereof being individually welded to the edge portion corresponding to the pole projection whereat the damper bar is arranged whereby said pressure plates short circuit all of said damper bars to each other at each of said end faces.

2. The smooth-core rotor of claim 1, each of said pressure fingers of said pressure plates having an opening formed therein at the outer end thereof corresponding to the shape of a damper bar, the part of said pressure finger defining said opening being joined to a corresponding one of said damper bars of said portion of damper bars on at least a part of the periphery of the bar.

3. A smooth-core rotor for a synchronous electric machine comprising a plurality of excitation windings; a rotor stack consisting of a stack of rotor laminations, said rotor stack defining respective longitudinal rotor end faces and defining a plurality of radial pole projections for corresponding ones of said excitation windings, said rotor stack further defining a plurality of slots disposed on respective sides of each one of said pole projections for accommodating the turns of the corresponding excitation winding, each two mutually adjacent ones of said slots defining a rotor tooth between them; and a damper arrangement including a plurality of damper bars disposed on said rotor stack, a portion of said damper bars being arranged at the rotor teeth and the remainder of said damper bars being arranged at the pole projections of said rotor stack, and a pressure plate disposed at each longitudinal end face of said rotor stack, said pressure plates each being configured to have pressure fingers at corresponding ones of the rotor teeth and to have an edge portion at each one of said pole projections, each of said damper bars of said portion thereof being connected individually with corresponding ones of said pressure fingers and each of the damper bars of said remainder thereof being individually connected to the edge portion corresponding to the pole projection whereat the damper bar is arranged whereby said pressure plates short circuit all of said damper bars to each other at each of said end faces, and a plurality of intermediate members, the damper bars of said portion of said damper bars being joined to corresponding ones of said pressure fingers through respective ones of a portion of said intermediate members, and the damper bars of said remainder of said damper bars being connected to said edge portions of said plates through the remainder of said intermediate members.

4. The smooth-core rotor of claim 3, said intermediate members being respective sleeves surrounding corresponding ones of said damper bars.

* * * * *